(12) United States Patent
Sasaki

(10) Patent No.: US 10,938,971 B2
(45) Date of Patent: Mar. 2, 2021

(54) ONBOARD DEVICE AND INFORMATION PROCESSING PROGRAM

(71) Applicant: TOYOTA JIDOSHA KABUSHIKI KAISHA, Toyota (JP)

(72) Inventor: Akira Sasaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/788,386

(22) Filed: Feb. 12, 2020

(65) Prior Publication Data

US 2020/0296198 A1   Sep. 17, 2020

(30) Foreign Application Priority Data

Mar. 11, 2019   (JP) .............................. JP2019-043877

(51) Int. Cl.
*H04M 1/00*   (2006.01)
*H04M 1/60*   (2006.01)
*H04W 4/80*   (2018.01)
*H04W 12/00*   (2021.01)

(52) U.S. Cl.
CPC ........... *H04M 1/6091* (2013.01); *H04W 4/80* (2018.02); *H04W 12/003* (2019.01); *H04M 2250/02* (2013.01)

(58) Field of Classification Search
CPC . H04M 1/6091; H04M 2250/02; H04W 4/80; H04W 12/003
USPC ...................................................... 455/569.2
See application file for complete search history.

(56) References Cited

U.S. PATENT DOCUMENTS

| | | | |
|---|---|---|---|
| 9,189,900 B1* | 11/2015 | Penilla ............... | G06Q 30/0645 |
| 9,773,353 B2* | 9/2017 | Naamani ................ | H04W 4/80 |
| 10,118,594 B2* | 11/2018 | Lickfelt ................ | B60R 25/403 |
| 10,249,117 B2* | 4/2019 | Okada ..................... | B60R 25/24 |
| 2015/0304473 A1* | 10/2015 | Moeller .................. | H04M 3/02 |
| | | | 455/426.1 |
| 2016/0007140 A1* | 1/2016 | Yae ........................ | H04W 4/80 |
| | | | 455/41.2 |
| 2017/0208430 A1* | 7/2017 | Tsuchida ............... | H04W 4/027 |
| 2019/0075437 A1* | 3/2019 | Shaikh ................ | H04M 1/6091 |
| 2020/0186590 A1* | 6/2020 | Penilla ................... | G06Q 20/18 |

FOREIGN PATENT DOCUMENTS

JP   2014-216714 A   11/2014

* cited by examiner

*Primary Examiner* — Sonny Trinh
(74) *Attorney, Agent, or Firm* — Oliff PLC

(57) ABSTRACT

An onboard device is provided in a vehicle and includes: a communication unit configured to perform short-range radio communication with a mobile terminal; and a pairing permitting unit configured to permit pairing between the onboard device and the mobile terminal by causing the mobile terminal to receive data including an identifier for uniquely identifying the onboard device when the mobile terminal in which the same identifier as the identifier is set comes within a predetermined distance from the onboard device.

7 Claims, 9 Drawing Sheets

ONBOARD DEVICE AND INFORMATION PROCESSING PROGRAM

INCORPORATION BY REFERENCE

The disclosure of Japanese Patent Application No. 2019-043877 filed on Mar. 11, 2019 including the specification, drawings and abstract is incorporated herein by reference in its entirety.

BACKGROUND

1. Technical Field

The disclosure relates to an onboard device and an information processing program.

2. Description of Related Art

Japanese Patent Application Publication No. 2014-216714 (JP 2014-216714 A) discloses a technique of allowing a mobile terminal such as a smartphone and an onboard device which is mounted in a vehicle to exchange information by short-range radio communication such as Bluetooth (registered trademark). Communication setting which is called pairing is required for communication between the mobile terminal and the onboard device. In the related art disclosed in JP 2014-216714 A, pairing is performed by allowing a user of a mobile terminal to perform predetermined setting in a state in which the user has entered a vehicle and the mobile terminal is within a predetermined distance from the onboard device. For example, the predetermined setting involves identifying the mobile terminal from a device identifier (ID) which is displayed in an indicator in the vehicle and additionally inputting predetermined information using an operation input device in the vehicle. After pairing has been performed once, the mobile terminal and the onboard device are automatically connected to each other by short-range radio communication when the mobile terminal comes within a predetermined distance from the onboard device even when the user does not perform the predetermined setting every time.

SUMMARY

However, in the related art disclosed in JP 2014-216714 A, since a user has to perform predetermined setting for pairing, the predetermined setting is troublesome and there is room for improvement in convenience for a user.

The disclosure is for improving convenience for a user.

According to an embodiment of the disclosure, there is provided an onboard device that is provided in a vehicle, the onboard device including: a communication unit configured to perform short-range radio communication with a mobile terminal; and a pairing permitting unit configured to permit pairing between the onboard device and the mobile terminal by causing the mobile terminal to receive data including an identifier for uniquely identifying the onboard device when the mobile terminal in which the same identifier as the identifier is set comes within a predetermined distance from the onboard device.

According to this embodiment, since the onboard device can permit pairing with the mobile terminal without causing a user to perform a predetermined setting as in the related art by sharing an identifier for uniquely identifying the onboard device with the mobile terminal, it is possible to improve convenience for a user.

In the embodiment, the pairing permitting unit may be configured to permit pairing with the mobile terminal when an acceleration value which is equal to or greater than a predetermined value is detected in the mobile terminal.

According to this embodiment, it is possible to start pairing depending on a situation in which the vehicle is used by using an acceleration value which is detected in the mobile terminal.

In the embodiment, the pairing permitting unit may be configured to permit pairing with the mobile terminal when an accessory power source of the vehicle is turned on due to an approach of an owner of a wireless portable key to the vehicle.

According to this embodiment, in comparison with a case in which an accessory power source is turned on when a start switch of the vehicle is pressed, it is possible to advance a time at which data required for the pairing is transmitted from the onboard device to a central server and to shorten a processing time until the pairing is performed.

In the embodiment, the pairing permitting unit may be configured to permit pairing with the mobile terminal when an accessory power source of the vehicle is turned on due to touch of an owner of a wireless portable key to a door handle of the vehicle.

According to this embodiment, in comparison with a case in which an accessory power source is turned on when a start switch of the vehicle is pressed, it is possible to advance a time at which data required for the pairing is transmitted from the onboard device to a central server and to shorten a processing time until the pairing is performed.

In the embodiment, the pairing permitting unit may be configured to permit pairing with the mobile terminal when an accessory power source of the vehicle is turned on due to press of a start switch that is used to request starting of a system of the vehicle.

According to this embodiment, since short-range radio communication between the onboard device and the mobile terminal is performed under an environment in which a field intensity of radio waves which are emitted from a communication device of the onboard device is relatively strong, it is possible to improve reliability of short-range radio communication and to allow the mobile terminal to reliably receive data such as an advertising packet which is transmitted from the onboard device to the mobile terminal.

Another embodiment of the disclosure can be realized as an information processing program.

According to the disclosure, it is possible to improve convenience for a user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Embodiment

Figure 1:
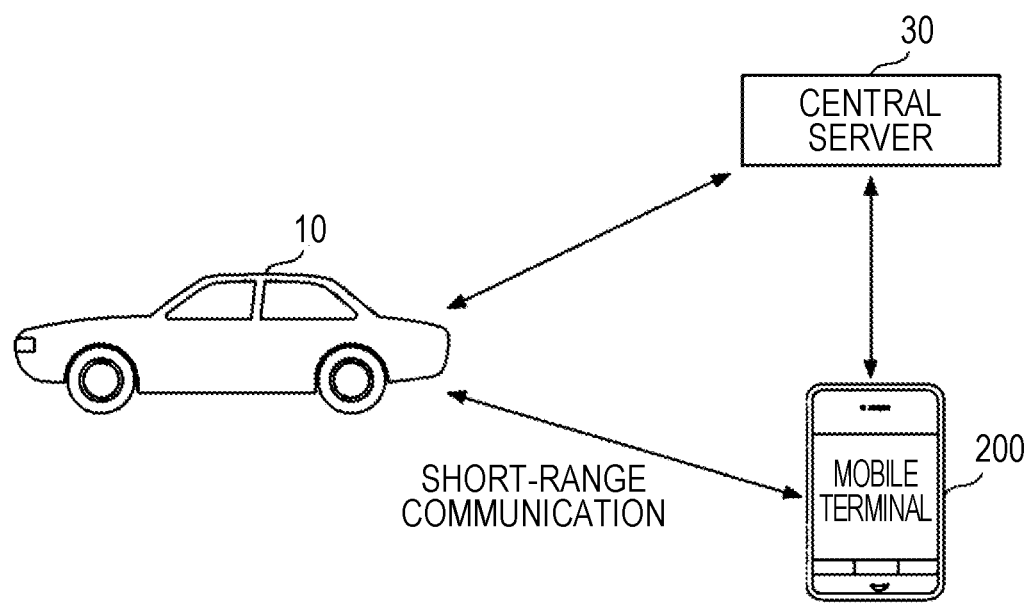
FIG. 1 is a diagram illustrating an example of a configuration of a communication system 300 according to an embodiment of the disclosure.

FIG. 1 is a diagram illustrating an example of a configuration of a communication system 300 according to an embodiment of the disclosure. The communication system 300 includes a vehicle 10, a mobile terminal 200, and a central server 30.

The vehicle 10 can perform radio communication at a relatively short distance (hereinafter referred to as "short-range radio communication") with a mobile terminal 200 in accordance with a predetermined communication standard. The vehicle 10 is communicatively connected to the central server 30 via a predetermined communication network. The predetermined communication network is, for example, a mobile phone network with a plurality of base stations as terminals or an Internet network. The vehicle 10 transmits vehicle information such as position information to the central server 30.

The mobile terminal 200 is a portable mobile terminal which is carried by an occupant (such as a driver or a fellow passenger) of the vehicle 10. The mobile terminal 200 is, for example, a mobile phone, a smartphone, a notebook PC, or a personal handy-phone system (PHS) and can perform communication in a mobile communication system. The mobile terminal 200 communicates with the central server 30 via a predetermined communication network (for example, a mobile phone network with a plurality of base stations as terminals or an Internet network) in accordance with a radio communication standard such as the Global System for Mobile Communications (GSM: registered trademark), code division multiple access (CDMA), Long Term Evolution (LTE), or Worldwide Interoperability for Microwave Access (WiMAX). An "occupant" is also a user of the mobile terminal 200 and thus may be referred to as a "user."

The mobile terminal 200 can perform short-range radio communication with the vehicle 10 by starting a predetermined application program which is installed in advance in a communication control unit 22. The predetermined application is a companion application that permits pairing with the mobile terminal 200 and an onboard device in the vehicle 10 without causing a user to perform a predetermined setting when the mobile terminal 200 comes within a predetermined communication range (for example, several tens of cm to several m) from the onboard device in the vehicle 10. In the following description, the "predetermined application program" is referred to as a "dedicated application." The predetermined setting involves, for example, specifying a mobile terminal based on a device ID which is displayed on a display in the vehicle 10 and additionally inputting predetermined information using an operation input device in the vehicle 10.

The communication system 300 according to the embodiment is configured to perform pairing between the mobile terminal 200 having a dedicated application installed therein and the vehicle 10 without a user's predetermined setting. Details of this configuration will be described later.

The central server 30 is communicatively connected to the vehicle 10 and the mobile terminal 200. The central server 30 is a server that provides various services. Examples of the various services include an authentication key service, a trunk delivery service, and a B2C car sharing service. The central server 30 stores the dedicated application and delivers the dedicated application to the mobile terminal 200 when a delivery request is received from the mobile terminal 200. Details of the communication operation of the mobile terminal 200 and the central server 30 will be described later.

In the following description, the outlines of communication functions of an onboard device in a vehicle 10 and a mobile terminal 200 which are subjected to pairing, the hardware configurations of the onboard device and the mobile terminal 200, and the functions of the onboard device and the mobile terminal 200 will be first described and then details of a pairing operation will be described.

Figure 2:
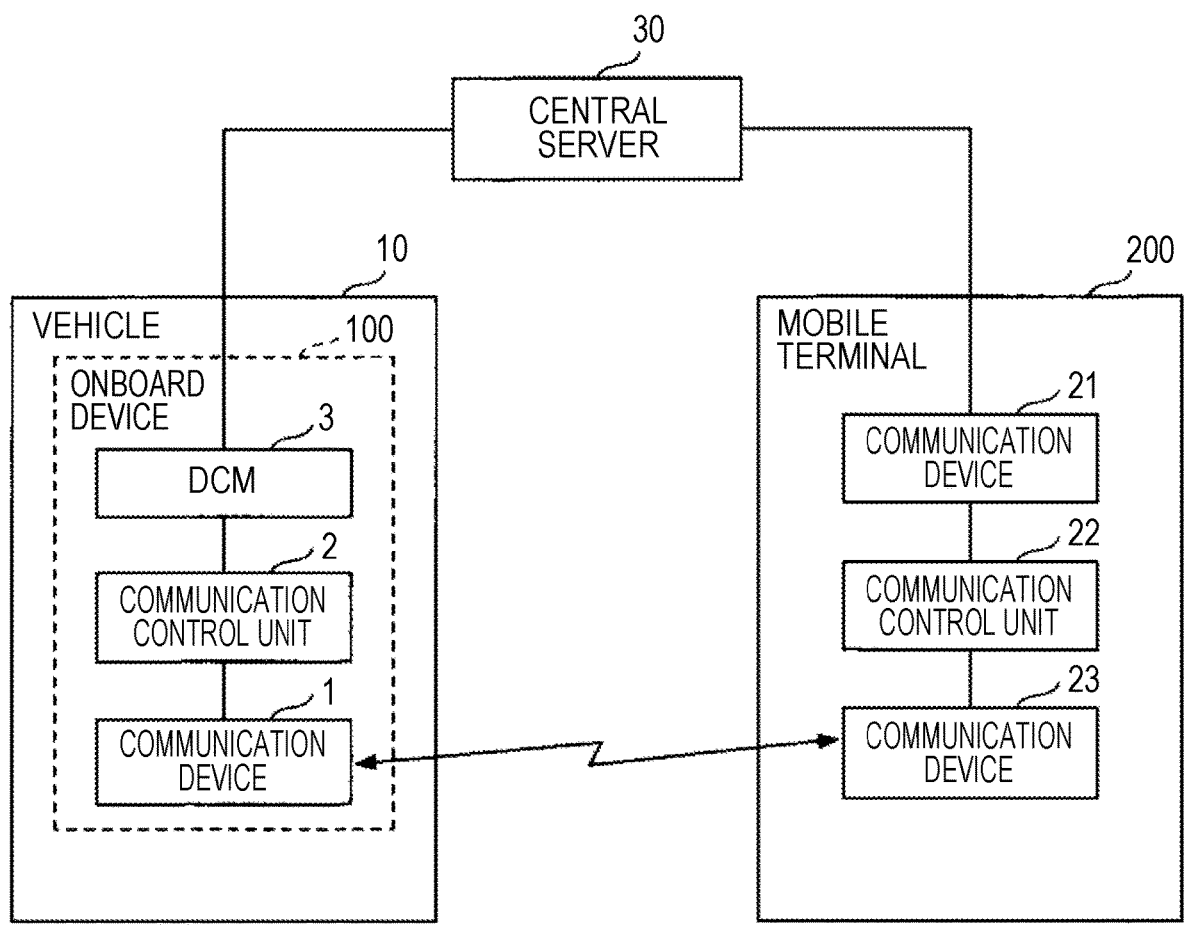
FIG. 2 is a diagram illustrating an example of a configuration associated with communication functions of a vehicle 10 and a mobile terminal 200.

First, configurations associated with the communication functions of the vehicle 10 and the mobile terminal 200 will be described with reference to FIG. 2. FIG. 2 is a diagram illustrating an example of a configuration of the communication functions of the vehicle 10 and the mobile terminal 200. As illustrated in FIG. 2, an onboard device 100 is provided in the vehicle 10. The onboard device 100 is, for example, a navigation device. The onboard device 100 is not limited to a navigation device and may be an audio device or a visual device or may be a device having the functions of these devices in combination.

For example, when the onboard device 100 is a navigation device, the onboard device 100 displays a map and a host vehicle position on a display using position information from a global navigation satellite system (GNSS) and map data.

When the onboard device 100 is an audio device, the onboard device 100 receives broadcast radio waves of a radio set or a television set and outputs sounds or images thereof, reproduces music data stored in a compact disc (CD) or a digital versatile disk (DVD) and outputs the music, or receives music data stored in the mobile terminal 200 and outputs the music from a speaker which is mounted in the vehicle 10.

Although not illustrated in FIG. 2, devices which are mounted in the vehicle 10 include an inverter, a motor ECU, a hybrid ECU, an engine ECU, a motor, and auxiliary machines. Examples of the auxiliary machines include an air conditioner, a radiator fan, and a rear defogger. The devices which are mounted in the vehicle 10 also include various sensors. Examples of the various sensors include a voltage sensor that detects a voltage which is input from a storage battery to the inverter, a voltage sensor that detects a voltage which is input from the inverter to the motor, a speed sensor that detects a vehicle speed, an accelerator sensor that detects an accelerator operation amount, and a brake sensor that detects a brake operation amount.

The onboard device 100 includes a communication device 1, a communication control unit 2, and a data communication module (DCM) 3. The communication device 1 is a communication unit that performs short-range radio communication with the mobile terminal 200, for example, in accordance with a Bluetooth low energy (BLE) communication standard. The communication device 1 is not limited to a communication unit based on the BLE communication standard as long as it is a communication unit that can perform short-range radio communication with the mobile terminal 200.

For example, the communication device 1 may be a communication unit based on a short-range communication standard with a very short communication range, such as a near-field communication (NFC) communication standard, a ZigBee (registered trademark) communication standard, or ultra-wide band (UWB). In this case, the communication device 1 may be incorporated at a position close to a body surface outside the vehicle 10 (for example, inside a door handle) or the like. Accordingly, the communication device 1 can communicate with the mobile terminal 200 outside the vehicle. For the purpose of simplification of explanation, the following description is based on the premise that a communication standard which is employed by the communication device 1 is the BLE communication standard.

The communication control unit 2 controls the communication device 1 such that a state in which communication based on a predetermined communication standard (such as the BLE communication standard) with the mobile terminal 200 is set up. Specifically, the communication control unit 2 controls the communication device 1 such that the communication device 1 transmits an advertising packet periodically (for example, every several seconds).

The communication control unit 2 controls the communication device 1 such that the advertising packet reaches a predetermined communication range from the communication device 1. An advertising packet includes advertisement information. The advertisement information includes a universally unique identifier (UUID) and a device ID. The UUID is, for example, an identifier for uniquely identifying the onboard device 100 (an onboard device ID) in software and is information which is shared by the onboard device 100 and the mobile terminal 200. When the onboard device 100 is turned on, the communication control unit 2 transmits an advertising packet which is data including the identifier to the mobile terminal 200.

When the mobile terminal 200 having received the advertising packet ascertains the UUID or the like included in the advertising packet, the communication control unit 2 sets up a state in which BLE communication between the mobile terminal 200 and the onboard device 100 is possible. At this time, the communication control unit 2 transmits a connection response indicating that the state in which BLE communication is possible is set up to the mobile terminal 200 via the communication device 1.

The DCM 3 is a communication device that interactively communicates with the central server 30 via a predetermined communication network. The DCM 3 transmits current position information of the vehicle which is input from the Global Positioning System (GPS) which is not illustrated to the central server 30 at a prescribed time, in response to a request from the central server 30, or the like.

The DCM 3 transmits a variety of vehicle information which can be acquired via an onboard network such as a controller area network (CAN) to the central server 30 at a prescribed time, in response to a request from the central server 30, or the like. The variety of vehicle information includes information indicating that a door of the vehicle 10 has been unlocked and information indicating that the vehicle 10 has been started.

The mobile terminal 200 includes a communication device 21, a communication control unit 22, and a communication device 23. The communication device 21 is a communication interface that transmits and receives data to and from the central server 30. The communication control unit 22 performs communication control for performing short-range radio communication based on the BLE communication standard with the communication device 1 of the vehicle 10 on the communication device 23. For example, when a mobile terminal 200 is located within a predetermined communication range from the communication device 1, the communication control unit 22 receives an advertising packet transmitted from the communication device 1 of the vehicle 10 via the communication device 23. The communication control unit 22 having received the advertising packet transmits connection request information for requesting connection based on BLE communication to the communication control unit 2. Accordingly, a state in which BLE communication between the mobile terminal 200 and the onboard device 100 of the vehicle 10 is possible is set up.

Figure 3:
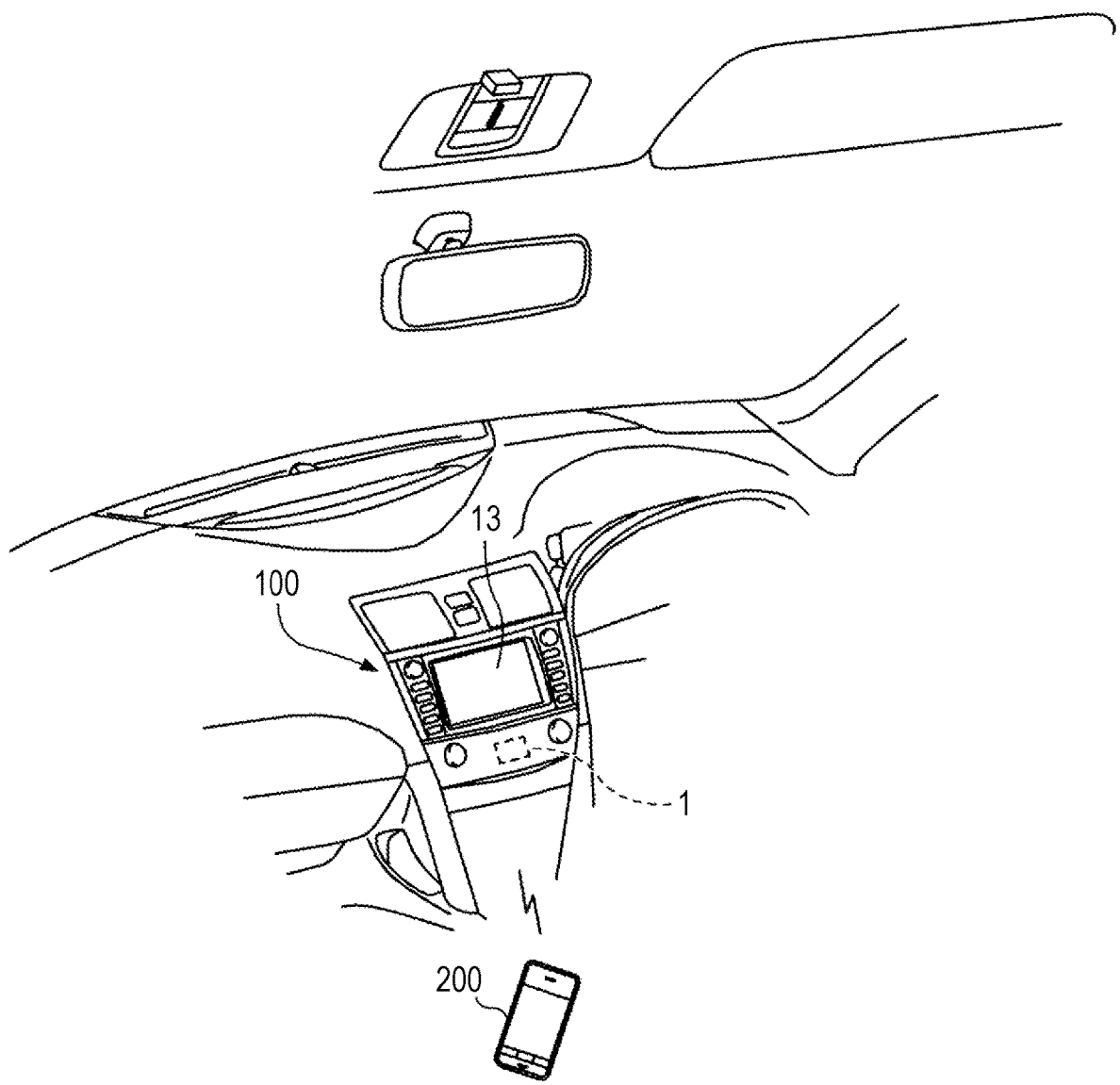
FIG. 3 is a diagram illustrating an example of an onboard device 100 and a mobile terminal 200.

An example of an onboard device 100 which is provided in a vehicle 10 and a mobile terminal 200 which is located within a predetermined communication range from the communication device 1 in the onboard device 100 will be described below with reference to FIG. 3. FIG. 3 is a diagram illustrating an example of an onboard device 100 and a mobile terminal 200. As illustrated in FIG. 3, the communication device 1 is provided in the onboard device 100. When a mobile terminal 200 is located within a predetermined communication range from the communication device 1, short-range radio communication is performed between the communication device 1 and the mobile terminal 200. Accordingly, various types of data can be transmitted from the onboard device 100 to the mobile terminal 200, and various types of data can be transmitted from the mobile terminal 200 to the onboard device 100. The various types of data are, for example, sound data, phone book data, and history data. The phone book data includes names or titles, phone numbers, types of phone numbers, and e-mail addresses. The types of phone numbers are types of phones which are associated with phone numbers, such as a stationary phone and a mobile phone. The history data includes phone numbers, dates and times, and history types. The history types include an incoming call, an outgoing call, and a missed call.

In this way, by causing the communication device 1 of the onboard device 100 to perform short-range radio communication with the mobile terminal 200, wiring of a cable for connection is not required and convenience for a user is improved in comparison with a case in which they are connected in a wired manner. Since wiring of a cable for connection is not necessary, the interior appearance of the vehicle 10 is not damaged.

Figure 4:
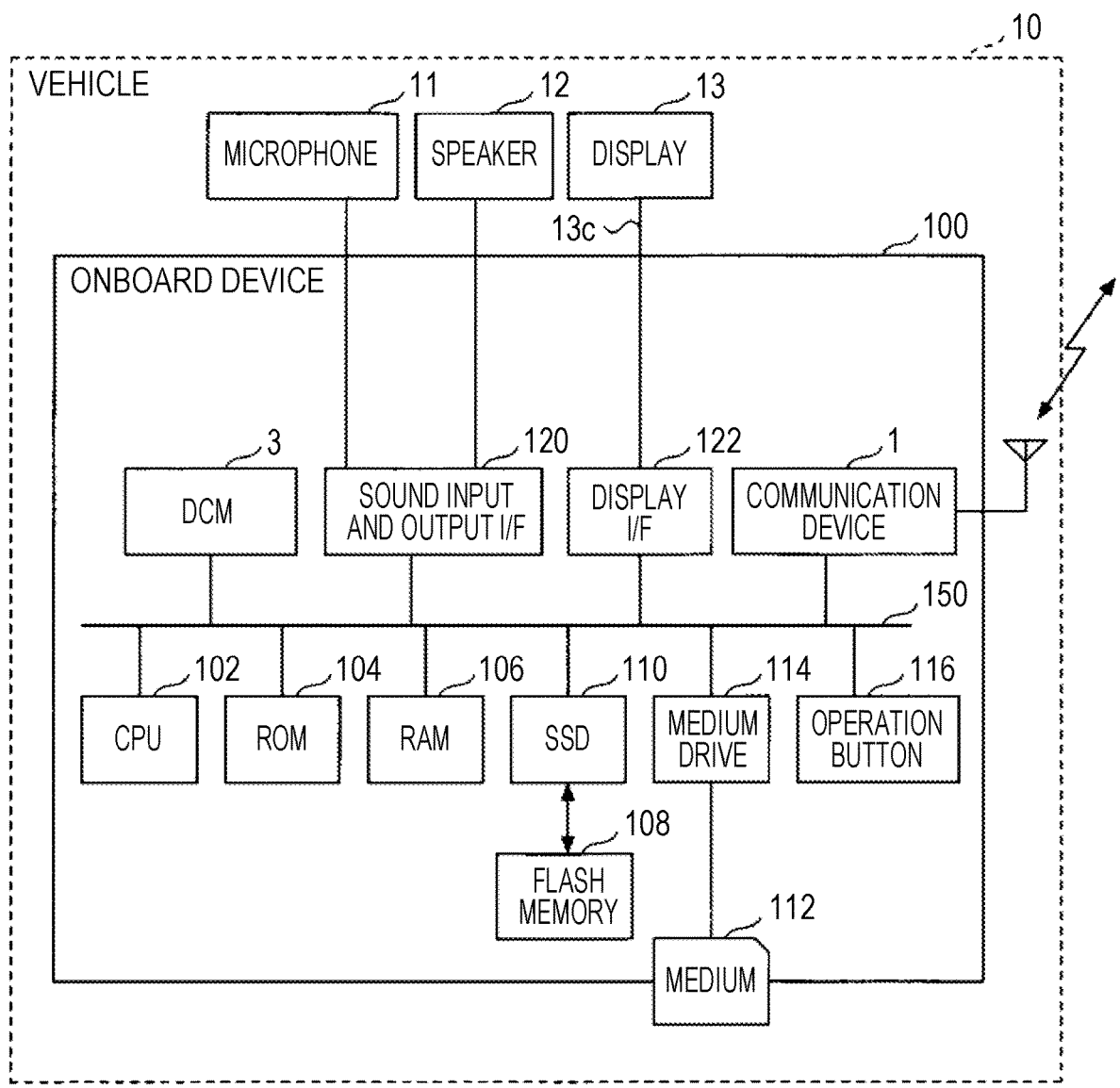
FIG. 4 is a diagram illustrating an example of a hardware configuration of an onboard device 100.

The hardware configuration of the onboard device 100 will be described below with reference to FIG. 4. FIG. 4 is a diagram illustrating an example of the hardware configuration of the onboard device 100. As illustrated in FIG. 4, the onboard device 100 includes a DCM 3, a central processing unit (CPU) 102, a read only memory (ROM) 104, a random access memory (RAM) 106, a flash memory 108, a solid state drive (SSD) 110, a medium drive 114, an operation button 116, and a communication device 1.

The CPU 102 is a processor that controls the whole operation of the onboard device 100. Programs for realizing the functions of the onboard device 100 are stored in the ROM 104. The RAM 106 is a memory that is used as a work area of the CPU 102.

The flash memory 108 is a nonvolatile memory that stores an onboard-device program and various types of data such as image data and sound data. The onboard-device program is a file in an installable format or an executable format and may be recorded on a computer-readable recording medium such as a recording medium 112 and distributed. The onboard-device program may be stored in the ROM 104 instead of the flash memory 108.

The nonvolatile memory is not limited to the flash memory 108, but may be a nonvolatile memory that performs reading or writing of data under the control of the CPU 102 and may be, for example, an electrically erasable and programmable ROM (EEPROM: registered trademark).

The SSD 110 is a memory that controls reading or writing of various types of data from and to the flash memory 108 under the control of the CPU 102.

The medium drive 114 controls reading or writing (storage) of data from or to the recording medium 112 such as the flash memory.

The operation button 116 is a button that is operated when a call destination is selected or the like.

The communication device 1 receives history data, phone book data, and the like which are transmitted from the mobile terminal 200 in accordance with a profile such as a phone book access profile (PBAP). The PBAP is a profile in which the order of transmitting phone book data or the like is defined in a pool type. In a connected state with the PBAP, a user can transmit phone book data from the mobile terminal 200 to the onboard device 100 by only operating the onboard device 100 without operating the mobile terminal 200.

The onboard device 100 includes a sound input and output I/F 120, a display I/F 122, and a bus line 150.

The sound input and output I/F 120 processes input and output of sound signals between the microphone 11 and the speaker 12 under the control of the CPU 102.

The display I/F 122 transmits image data to an externally attached display 13 under the control of the CPU 102.

The bus line 150 includes an address bus, a data bus, or the like for electrical connection of the elements as illustrated in FIG. 4.

The display 13 is a display unit which is constituted by a liquid crystal or an organic electroluminescence (EL) that displays an operation icon and the like. The display 13 is connected to the display I/F 122 via a cable 13c. The cable 13c may be a cable for analog RGB (VGA) signals, may be a cable for component video, or may be a cable for High-Definition Multimedia Interface (HDMI: registered trademark) or Digital Video Interactive (DVI) signals.

The recording medium 112 is detachably attached to the onboard device 100.

Figure 5:
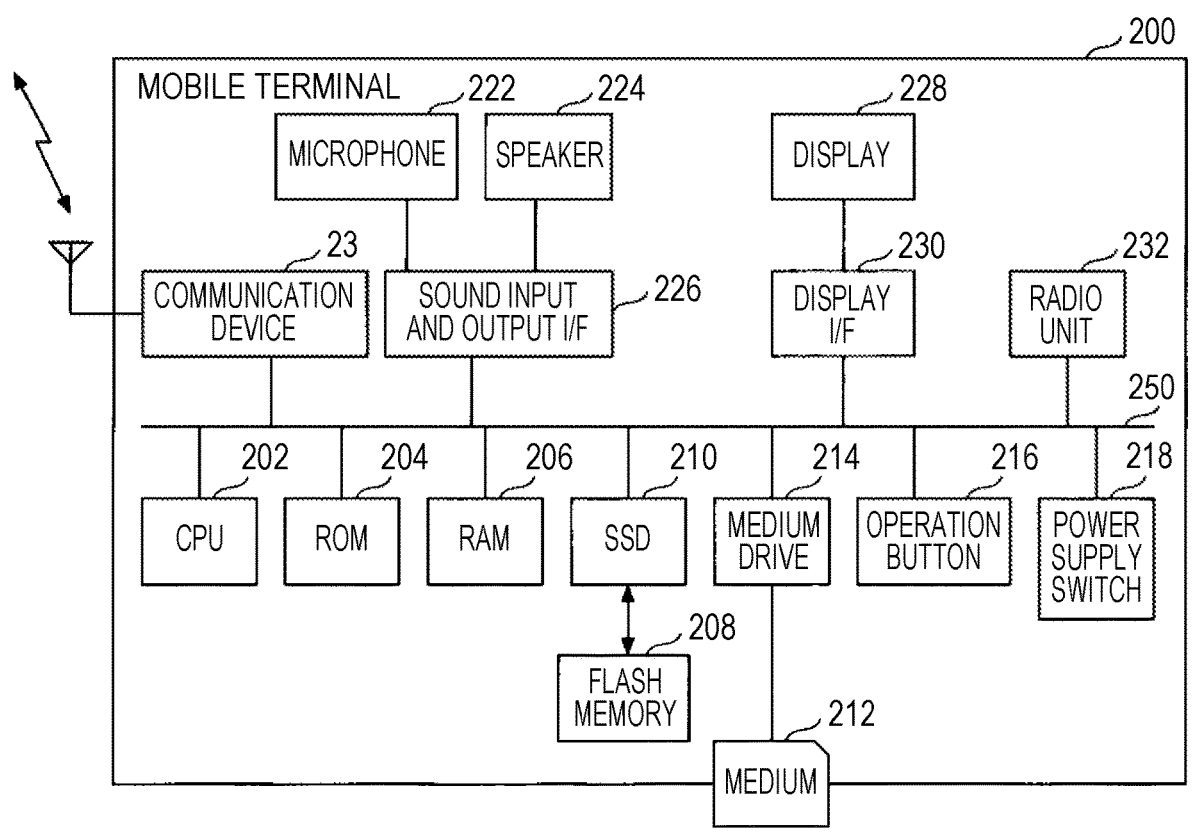
FIG. 5 is a diagram illustrating an example of a hardware configuration of a mobile terminal 200.

The hardware configuration of a mobile terminal 200 will be described below with reference to FIG. 5. FIG. 5 is a diagram illustrating an example of the hardware configuration of a mobile terminal 200. As illustrated in FIG. 5, the mobile terminal 200 includes a CPU 202, a ROM 204, a RAM 206, a flash memory 208, an SSD 210, a medium drive 214, an operation button 216, a power supply switch 218, and a communication device 23.

The CPU 202 is a controller that controls the whole operation of the mobile terminal 200. A program which is used to drive the CPU 202 is stored in the ROM 204. The RAM 206 is a memory which is used as a work area of the CPU 202. The flash memory 208 is a nonvolatile memory that stores a mobile-terminal program and various types of data such as image data and sound data. The mobile-terminal program is a file in an installable format or an executable format and may be recorded in a computer-readable recording medium such as a recording medium 212 and may be distributed. The mobile-terminal program may be stored in the ROM 204 instead of the flash memory 208. The nonvolatile memory is not limited to the flash memory 208, but may be a nonvolatile memory that performs reading or writing of data under the control of the CPU 202 and may be, for example, an EEPROM.

The SSD 210 is a memory that controls reading or writing of various types of data from or to the flash memory 208 under the control of the CPU 202.

The medium drive 214 controls reading or writing (storage) of data from or to the recording medium 212 such as the flash memory.

The operation button 216 is a button that is operated to select a communication partner of the mobile terminal 200 or the like.

The power supply switch 218 is a switch that switches the power supply of the mobile terminal 200 between ON and OFF.

The mobile terminal 200 includes a built-in microphone 222 that receives sound, a built-in speaker 224 that outputs sound, and a sound input and output I/F 226.

The sound input and output I/F 226 processes input and output of sound signals between the microphone 222 and the speaker 224 under the control of the CPU 202.

The mobile terminal 200 includes a display 228 that is constituted by a liquid crystal or an organic EL that displays an image of a subject or an operation icon, and the like and a display I/F 230 that transmits image data to the display 228 under the control of the CPU 202.

The mobile terminal 200 includes a bus line 250 such as an address bus or a data bus for electrical connection of the elements thereof as illustrated in FIG. 5.

The recording medium 212 is detachably attached to the mobile terminal 200.

Figure 6:
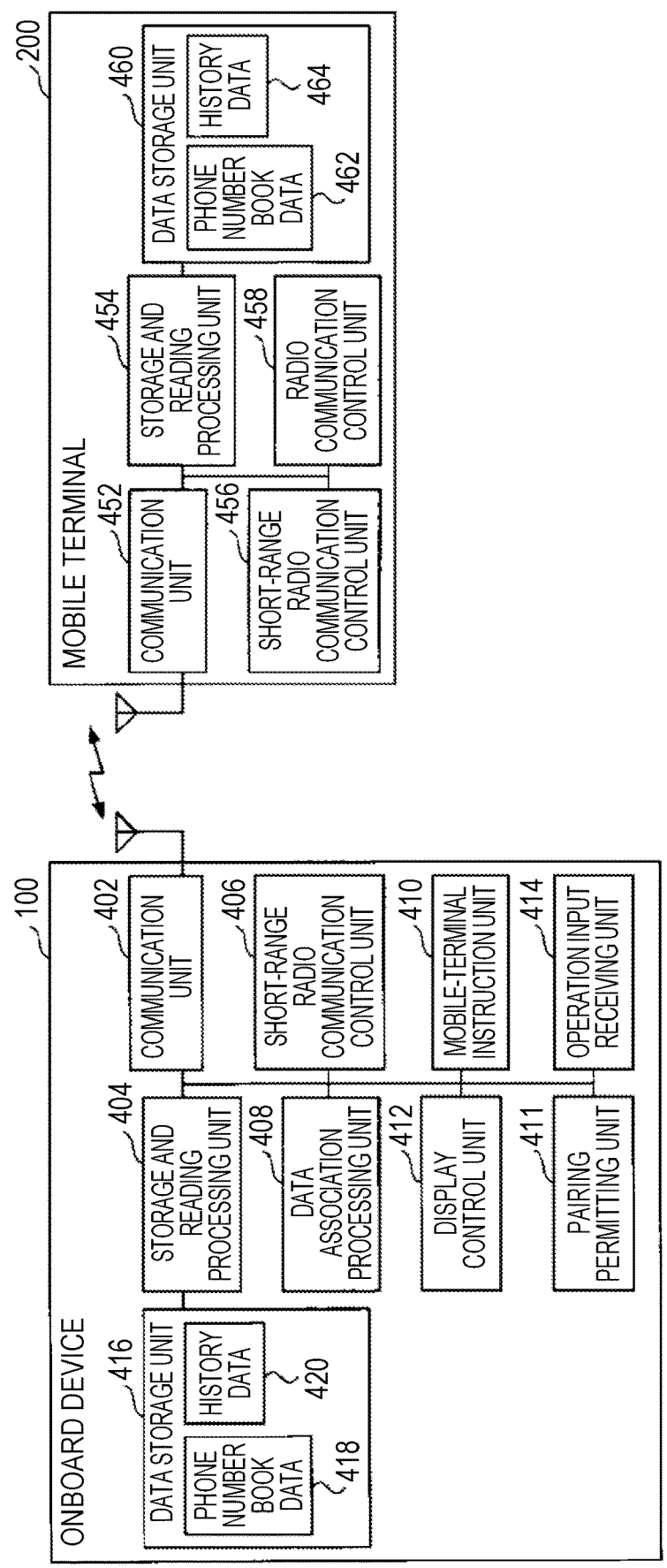
FIG. 6 is a functional block diagram illustrating an onboard device 100 and a mobile terminal 200.

The functional configurations of the onboard device 100 and the mobile terminal 200 will be described below with reference to FIG. 6. FIG. 6 is a functional block diagram of the onboard device 100 and the mobile terminal 200. In FIG. 6, the onboard device 100 and the mobile terminal 200 are wirelessly connected to each other such that they can perform short-range radio communication with each other. Hereinafter, the functions of the onboard device 100 will be first described and then the functions of the mobile terminal 200 will be described.

The onboard device 100 includes a communication unit 402, a storage and reading processing unit 404, a short-range radio communication control unit 406, a data association processing unit 408, a mobile-terminal instruction unit 410, a pairing permitting unit 411, a display control unit 412, and an operation input receiving unit 414.

The communication unit 402, the storage and reading processing unit 404, the short-range radio communication control unit 406, the data association processing unit 408, the mobile-terminal instruction unit 410, the pairing permitting unit 411, the display control unit 412, and the operation input receiving unit 414 are embodied by causing the CPU 102 illustrated in FIG. 4 to execute the onboard-device program stored in the RAM 106.

The onboard device 100 includes a data storage unit 416 which is constructed by the flash memory 108 illustrated in FIG. 4.

Details of the functions of the onboard device 100 will be described below with reference to FIGS. 4 and 6. The functional constituent units of the onboard device 100 will be described below along with relationships with main constituent elements for embodying the functional constituent units of the onboard device 100 out of the constituent elements illustrated in FIG. 4.

The communication unit 402 illustrated in FIG. 6 is embodied by a command from the CPU 102 illustrated in FIG. 4 and the communication device 1 illustrated in FIG. 4.

The communication unit 402 transmits and receives various types of data to and from the mobile terminal 200 by short-range radio communication. The communication unit 402 performs a connection process to the mobile terminal 200 when the mobile terminal 200 enters an area in which it can perform short-range communication with the communication device 1.

Here, a flow of operations when short-range radio communication is first performed between an onboard device and a mobile terminal in the related art will be described in brief. A user inputs a personal identification number (PIN) code instructed by the onboard device 100 to the mobile terminal 200. The onboard device 100 and the mobile terminal 200 search devices using the PIN code, and the onboard device 100 generates a specific link key between two devices and transmits the generated specific link key to the mobile terminal 200. Accordingly, pairing between the onboard device 100 and the mobile terminal 200 is completed. Since the onboard device 100 and the mobile terminal 200 store the link key, the onboard device 100 can authenticate the mobile terminal 200 using the link key such that communication is possible by merely allowing the mobile terminal 200 to enter the communication range of the onboard device 100 when pairing is completed once.

The Bluetooth decides various profiles depending on applications in order to guarantee communications between various devices. In order to allow two devices to communicate with each other, the two devices need to have the same profile mounted therein. A generic access profile (GAP), a service discovery application profile (SDAP), and a serial port profile (SPP), and the like are basic profiles and are mounted in a lower layer (a hardware side). The onboard device 100 and the mobile terminal 200 both have a phone book access profile (PBAP) that transmits and receives phone book data in an upper layer of such general profiles. The PBAP is a profile for allowing the onboard device 100 to acquire phone book data or the like from the mobile terminal 200 without causing a user to operate the mobile terminal 200.

The storage and reading processing unit 404 of the onboard device 100 is embodied by a command from the CPU 102 illustrated in FIG. 4 and the SSD 110 illustrated in FIG. 4, and performs a process of storing various types of data in the data storage unit 416 or reading various types of data stored in the data storage unit 416.

The data storage unit 416 of the onboard device 100 stores phone book data 418, history data 420, and the like as examples of a database. The phone book data 418 and the history data 420 which are stored in the data storage unit 416 are not deleted even when an engine of a vehicle in which the onboard device 100 is mounted is turned off.

The short-range radio communication control unit 406 of the onboard device 100 is embodied by a command from the CPU 102 illustrated in FIG. 4 and the communication control unit 2 illustrated in FIG. 2. The short-range radio communication control unit 406 performs communication control for performing, for example, short-range radio communication based on the BLE communication standard with the communication unit 452 of the mobile terminal 200 on the communication unit 402.

The pairing permitting unit 411 is embodied by a command from the CPU 102 illustrated in FIG. 4 and the communication control unit 2 illustrated in FIG. 2. When the mobile terminal 200 in which the same identifier as the onboard device ID is set comes within a predetermined distance from the onboard device 100, the pairing permitting unit 411 permits pairing between the onboard device 100 and the mobile terminal 200 by causing the mobile terminal 200 to receive data including the identifier (an advertising packet).

The data association processing unit 408 of the onboard device 100 is embodied by a command from the CPU 102 illustrated in FIG. 4. The data association processing unit 408 correlates phone numbers constituting history data 464, phone numbers constituting the phone book data 418, and names or titles constituting the phone book data 418 and specifies names or titles corresponding to the phone numbers constituting the history data 464 by associating the phone numbers constituting the history data 464 which is wirelessly transmitted from the mobile terminal 200 by short-range radio communication with the phone numbers constituting the phone book data 418 stored in the data storage unit 416. That is, the data association processing unit 408 extracts the same phone numbers as the phone numbers constituting the history data 464 which is wirelessly transmitted from the mobile terminal 200 from the phone numbers constituting the phone book data 418 which is stored in the data storage unit 416 and associates the extracted phone numbers. Then, the data association processing unit 408 specifies names or titles associated with the phone numbers extracted from the phone numbers constituting the phone book data 418 stored in the data storage unit 416.

The display control unit 412 of the onboard device 100 is embodied by a command from the CPU 102 illustrated in FIG. 4 and the display I/F 122 illustrated in FIG. 4.

The display control unit 412 performs control for transmitting image data to the display 13. For example, the display control unit 412 performs control for replacing the phone numbers 464 with names or titles corresponding to the phone numbers of the history data 464 specified by the data association processing unit 408 and displaying the names or titles on the display 13 when a history list is displayed based on the history data 464 which is wirelessly transmitted from the mobile terminal 200.

The operation input receiving unit 414 of the onboard device 100 is embodied by a command from the CPU 102 illustrated in FIG. 4 and the operation button 116 illustrated in FIG. 4, and receives various inputs from a user.

The mobile-terminal instruction unit 410 of the onboard device 100 is embodied by a command from the CPU 102 illustrated in FIG. 4 and the operation button 116 illustrated in FIG. 4. The mobile-terminal instruction unit 410 wirelessly transmits an instruction from the communication unit 402 to the mobile terminal 200 using a phone number corresponding to a name or title which is designated by allowing a user to operate the operation button 116 with reference to the history list as a call destination.

The functions of the mobile terminal 200 will be described below. As illustrated in FIG. 6, the mobile terminal 200 includes a communication unit 452, a storage and reading processing unit 454, a short-range radio communication control unit 456, and a radio communication control unit 458. The communication unit 452, the storage and reading processing unit 454, the short-range radio communication control unit 456, and the radio communication control unit 458 are embodied by causing the CPU 202 illustrated in FIG. 5 to execute a dedicated program stored in the ROM 204.

The mobile terminal 200 includes a data storage unit 460 which is constructed by the flash memory 208 illustrated in FIG. 5.

Details of the functional elements of the mobile terminal 200 will be described below with reference to FIGS. 5 and 6. The functional constituent units of the mobile terminal 200 will be described below along with relationships with main constituent elements for embodying the functional constituent units of the mobile terminal 200 out of the constituent elements illustrated in FIG. 5.

The communication unit 452 of the mobile terminal 200 illustrated in FIG. 6 is embodied by a command from the CPU 202 illustrated in FIG. 5 and the communication device 23 illustrated in FIG. 5. The communication unit 452 transmits and receives various types of data to and from the onboard device 100 by short-range radio communication. The communication unit 452 performs a connection process to the onboard device 100 when the mobile terminal 200 enters an area in which the mobile terminal 200 can perform short-range radio communication with the communication device 1 of the onboard device 100. The communication between the onboard device 100 and the mobile terminal 200 is the same as described above and thus description thereof will not be repeated.

The storage and reading processing unit 454 of the mobile terminal 200 is embodied by a command from the CPU 202 illustrated in FIG. 5 and the SSD 210 illustrated in FIG. 5. The storage and reading processing unit 454 performs a process of storing various types of data in the data storage unit 460 and reading various types of data stored in the data storage unit 460. The data storage unit 460 stores phone book data 462, history data 464, and the like as examples of a database.

The short-range radio communication control unit 456 of the mobile terminal 200 is embodied by a command from the CPU 202 illustrated in FIG. 5 and the communication control unit 22 illustrated in FIG. 2. The short-range radio communication control unit 456 performs communication control for performing, for example, short-range radio communication based on the BLE communication standard with the communication unit 402 of the onboard device 100 on the communication unit 452.

The radio communication control unit 458 of the mobile terminal 200 is embodied by a command from the CPU 202 illustrated in FIG. 5 and a radio unit 232 illustrated in FIG. 5. The radio communication control unit 458 makes a call to a phone number designated by a user by radio communication in a mobile communication system. For example, when phone number information which is wirelessly transmitted from the onboard device 100 is received by the communication unit 452, the radio communication control unit 458 issues a call to the received phone number.

Figure 7:
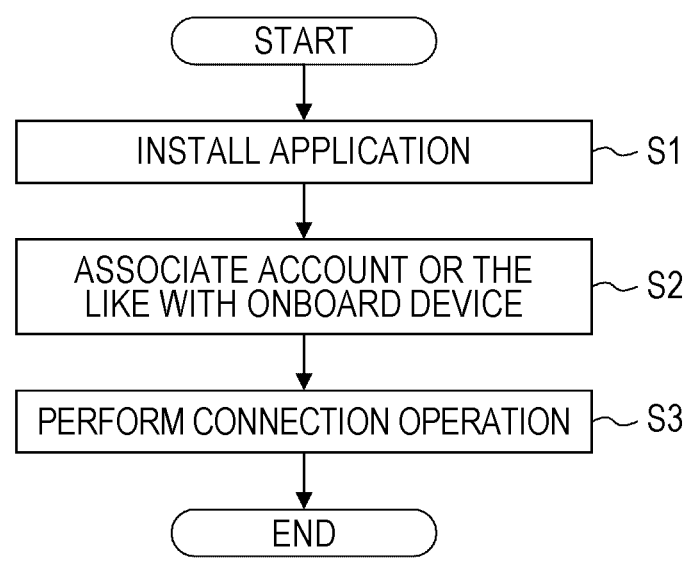
FIG. 7 is a flowchart illustrating a flow of operations in an onboard device 100 and a mobile terminal 200.

Operations of the onboard device 100 and the mobile terminal 200 will be described below. FIG. 7 is a flowchart illustrating the operations of the onboard device 100 and the mobile terminal 200.

A dedicated application for performing pairing between the mobile terminal 200 and the vehicle 10 is installed in the mobile terminal 200 (Step S1).

For example, by causing the mobile terminal 200 to read a QR code (registered trademark) which is displayed on the display 13 of the onboard device 100 or the like, the mobile terminal 200 accesses the central server 30 illustrated in FIG. 2 and the dedicated application stored therein is downloaded to the mobile terminal 200. When an operation of permitting installation of the downloaded dedicated application in the mobile terminal 200 is performed, the dedicated application is installed in the mobile terminal 200. The method of downloading the dedicated application to the mobile terminal 200 is not limited thereto, and the application may be downloaded, for example, by causing a vehicle shop to transmit a URL for accessing a store from which the application can be provided using a short message or the like in response to a request from a user of the mobile terminal 200 and allowing the mobile terminal 200 having received the URL to access the URL.

Figure 8:
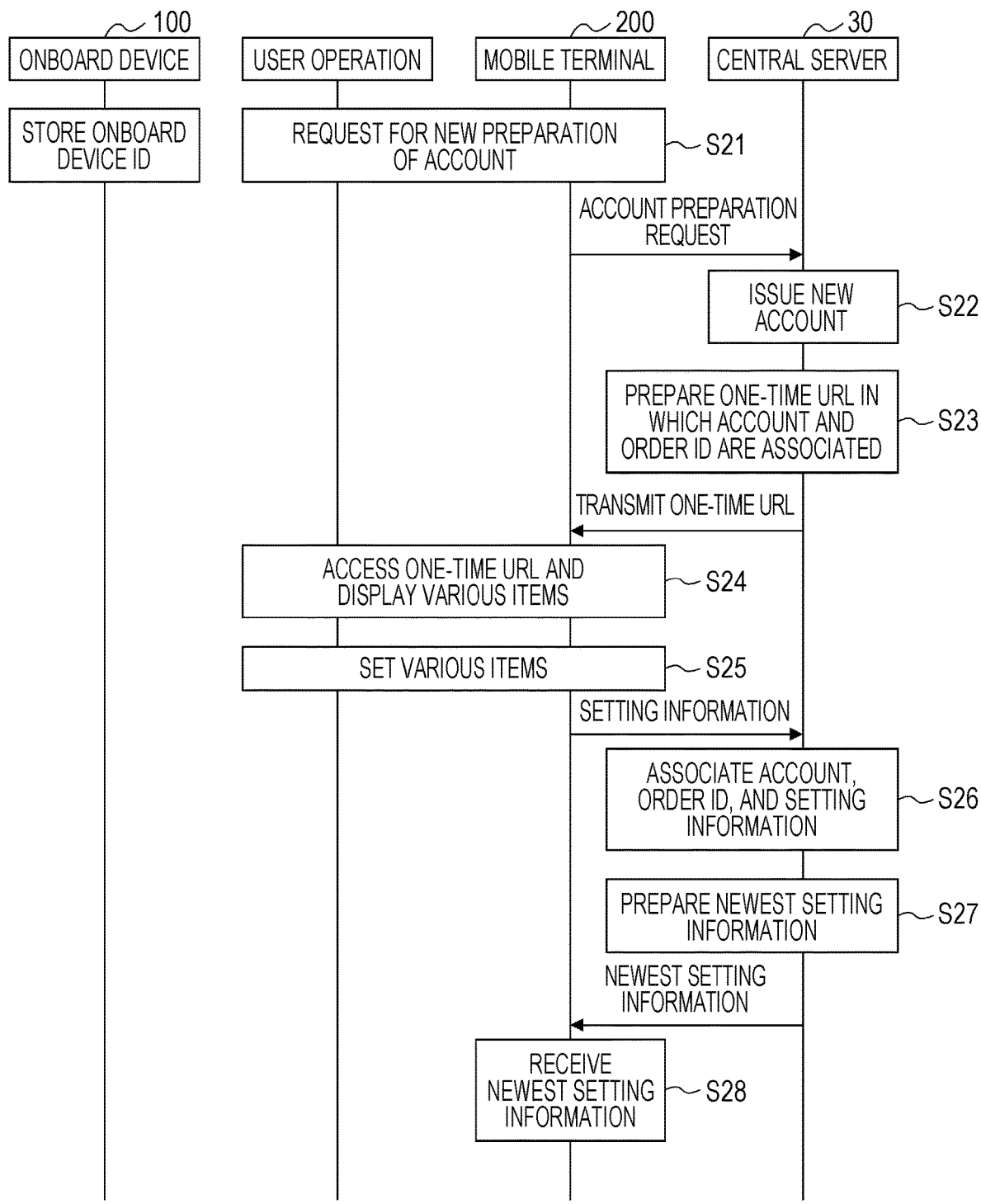
FIG. 8 is a sequence chart illustrating a process flow of associating an account or the like with an onboard device 100.

In Step S2, association of an account or the like with the onboard device 100 is performed. Process details of Step S2 will be described below with reference to FIG. 8. FIG. 8 is a sequence chart illustrating a process of associating an account or the like with the onboard device 100.

In Step S21, the central server 30 is requested to prepare a new account for identifying a user of the mobile terminal 200 by causing the user to operate the mobile terminal 200. For example, it is requested to prepare a new account by accessing the central server 30 after starting the dedicated application installed in the mobile terminal 200 and inputting predetermined information (such as a name of the user and a login password).

In Step S22, the central server 30 having received a request for preparing a new account issues a new account, for example, with reference to an account management database (DB) in the central server 30.

In Step S23, the central server 30 associates the newly issued account with an order ID and prepares a one-time uniform resource locator (URL). The order ID includes an onboard device ID and a user ID. The user ID is user identification information for identifying the user. The one-time URL is described in a short message, a mail, or the like and is transmitted to the mobile terminal 200 having requested for preparing an account.

In Step S24, the mobile terminal 200 having received a short message or the like with the one-time URL displays the one-time URL on the display 228 of the mobile terminal 200. When the one-time URL displayed on the display 228 of the mobile terminal 200 is touched, the mobile terminal 200 accesses the one-time URL.

Accordingly, a screen for inputting various items associated with setting of the onboard device 100 is displayed on the display 228 of the mobile terminal 200. The screen is an input screen which is displayed on the display 228 of the mobile terminal 200 in accordance with the dedicated application. Examples of the items associated with setting of the onboard device 100 include a language at the time of operating the onboard device 100 and an address indicating a location of the home.

In Step S25, when the user sets various items, setting information indicating the set details is transmitted to the central server 30.

In Step S26, the central server 30 having received the setting information from the mobile terminal 200 associates the setting information with the issued account and the order ID.

In Step S27, the central server 30 transmits the newest setting information associated with the set values of the onboard device 100 to the mobile terminal 200.

In Step S28, the mobile terminal 200 receives the newest setting information.

Through this process, the onboard device ID of the onboard device 100 is associated with the user ID of the user who owns the mobile terminal 200. The onboard device ID may be associated with a user ID of a user who may board the vehicle 10 and a relative other than the user.

Figure 9:
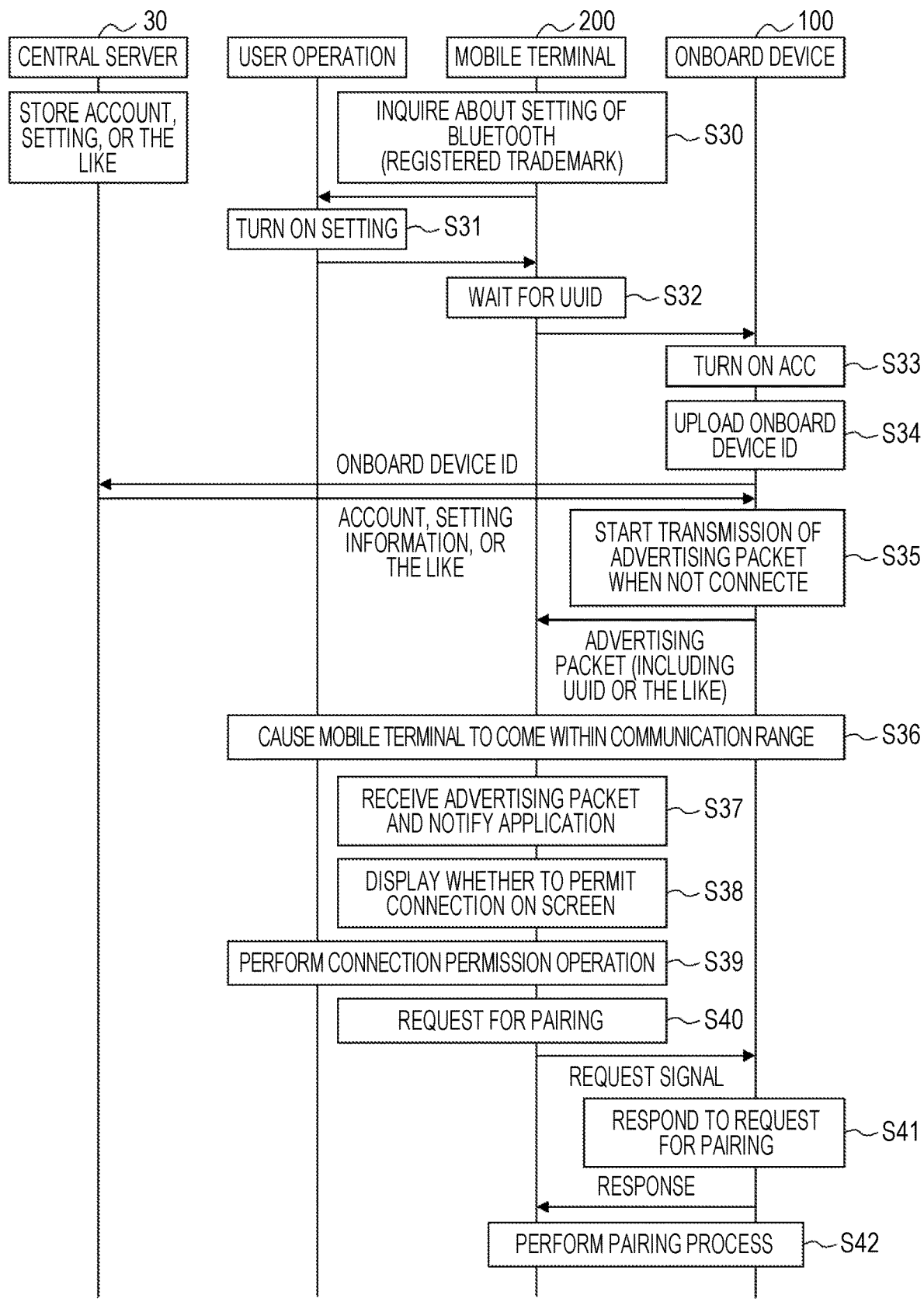
FIG. 9 is a sequence chart illustrating a process flow until connection of a mobile terminal 200 to an onboard device 100 is permitted.

Referring back to FIG. 7, in Step S3, processes up to permission of connection of the mobile terminal 200 to the onboard device 100 is performed. Process details of Step S3 will be described below in detail with reference to FIG. 9. FIG. 9 is a sequence chart illustrating processes up to permission of connection of the mobile terminal 200 to the onboard device 100.

In Step S30, when the Bluetooth of the mobile terminal 200 is set to OFF, the mobile terminal 200 cannot perform short-range radio communication with the onboard device 100 and thus the mobile terminal 200 displays a guidance for inquiring about whether the Bluetooth is to be set to ON, for example, "Do you want set the Bluetooth to ON? (YES/NO)," on the display 228.

The time at which whether the Bluetooth is to be set to ON is inquired about is a time at which the dedicated application is installed and a time at which an accessory power source of the vehicle 10 is turned on. Details of the guidance for inquiring about whether the Bluetooth is to be set to ON is not limited to the above-mentioned example as long as it has details for prompting the user to set the Bluetooth to ON.

In Step S31, when "YES" is selected in the guidance, the Bluetooth is set to ON.

In Step S32, the dedicated application in the mobile terminal 200 in which the Bluetooth has been set to ON waits for a UUID. Since the UUID is registered in an operation system (OS) of the mobile terminal 200, the mobile terminal 200 can perform short-range radio communication with the onboard device 100 by receiving an advertising packet (data including the UUID) from the onboard device 100 as will be described later. The OS of the mobile terminal 200 is, for example, Android (registered trademark) or iOS (registered trademark). The UUID waiting state may be any of a normal operating state and a background state. The normal operating state is a state in which the dedicated application is performing a certain process. The background state is a state in which the dedicated application is performing a certain process but is not displayed on the screen.

In Step S33, when the accessory power source of the vehicle 10 is turned on (ACC ON), the onboard device 100 is started and the processes of Step S34 and steps subsequent thereto are performed. The time at which the accessory power source is turned is, for example, a time at which an owner of a wireless portable key approaches the vehicle, a time at which an owner of a wireless portable key touches a door handle of the vehicle 10, or a time at which a start switch in the vehicle 10 is pressed. The start switch is a switch which requests start of the system of the vehicle 10 by the user or receives stop of the system of the vehicle 10.

When the accessory power source is turned on at a time at which a user with a key to the vehicle 10 touches a door handle of the vehicle 10, for example, a smart key system which is provided in the onboard device 100 is used. For example, when an owner of a wireless portable key approaches the vehicle or when an owner of a wireless portable key touches a door handle of the vehicle 10, the smart key system turns on the accessory power source to enable opening/closing of a door lock and start of an engine by emitting weak radio waves from an antenna unit of the vehicle 10 and emitting a response signal (radio waves) from the wireless portable key having received the weak radio waves.

The pairing permitting unit 411 permits pairing with the mobile terminal when the accessory power source of the vehicle is turned on due to approach of an owner of a wireless portable key to the vehicle or when the accessory power source of the vehicle is turned on due to touch of an owner of a wireless portable key with a door handle of the vehicle. Since the time at which the process of Step S34 is started can be advanced by turning on the accessory power source when an owner of a wireless portable key approaches the vehicle, when a user with a key to the vehicle 10 touches a door handle of the vehicle 10, or the like, it is possible to advance the time at which the onboard device ID is transmitted from the onboard device 100 to the central server 30 and to shorten the process time until pairing is performed.

The pairing permitting unit 411 permits pairing with the mobile terminal when the accessory power source of the vehicle is turned on due to press of a start switch for requesting for start of the system of the vehicle. When the accessory power source is turned on at the time of the start switch in the vehicle 10 is pressed, the processes of Step S34 and steps subsequent thereto are performed under an environment in which a field intensity of radio waves emitted from the communication device 1 of the onboard device 100 is relatively strong. Accordingly, reliability of short-range radio communication can be improved, and the mobile terminal 200 can reliably receive an advertising packet in Step S37, for example, when the onboard device 100 starts transmission of the advertising packet in Step S35 as will be described later. For example, when a user does not board the vehicle 10 but is located in the vicinity of the vehicle 10, the accessory power source is not turned on and thus it is possible to reduce power consumption of a storage battery which is mounted in the vehicle 10 and to curb deterioration of the storage battery.

In Step S34, the onboard device 100 which has been started by ACC ON uploads the onboard device ID to the central server 30. Since an account corresponding to the onboard device ID, setting information, and the like are stored in the central server 30, the central server 30 having received the onboard device ID transmits the account corresponding to the onboard device ID, the setting information, and the like to the onboard device 100. Accordingly, the account corresponding to the onboard device ID, the setting information, and the like are downloaded to the onboard device 100.

When the mobile terminal 200 is not connected to the onboard device 100 in Step S35, the onboard device 100 having downloaded the account corresponding to the onboard device ID, the setting information, and the like starts transmission of an advertising packet to the mobile terminal 200. As described above, the advertising packet includes a UUID (an identifier for uniquely identifying the onboard device 100). The UUID is registered, for example, in the OS of the mobile terminal 200 by a dedicated application. Accordingly, by transmitting the advertising packet to the mobile terminal 200 in which the UUID is registered, it is possible to associate the mobile terminal 200 with the onboard device 100.

When the mobile terminal 200 comes within a predetermined communication distance from the communication device 1 in a state in which an advertising packet has been transmitted in Step S36, the communication device 23 of the mobile terminal 200 can receive the advertising packet in Step S37.

The communication control unit 22 of the mobile terminal 200 having received an advertising packet notifies the installed dedicated application that the advertising packet in which a common UUID is described has been received.

In Step S38, the dedicated application having been notified that the advertising packet has been received displays a message inquiring of a user about whether access to the onboard device 100 is to be accepted on the screen (the display 228) of the mobile terminal 200. Accordingly, it is possible to ascertain whether access of the mobile terminal 200 to the onboard device 100 is to be permitted. By performing the processes of Step S38 and S39, it is possible to enable secure communication of the mobile terminal 200 with the onboard device 100.

When the user performs an operation of permitting an access in Step S39, the mobile terminal 200 generates a pairing request (a pairing request signal) using a generic attribute (GATT) profile and transmits the pairing request to the onboard device 100 in order to request the onboard device 100 for pairing in Step S40. The GATT profile is a profile that takes charge of reading and writing (transmission and reception) of information based on the BLE standard.

In Step S41, the communication control unit 2 of the onboard device 100 having received the request signal generates a response signal indicating that pairing is permitted and transmits the response signal to the mobile terminal 200. Accordingly, a pairing process (transmission and reception of data by short-range radio communication) is started (Step S42).

In this embodiment, an example of a configuration in which pairing is started when a user performs an access permitting operation after the mobile terminal 200 has inquired about whether an access to the onboard device 100 is to be permitted in the processes of Step S38 and S39 has been described above, but the processes of Steps S38 and S39 may be omitted and the process of Step S40 may be performed immediately after the process of Step S37 has been performed. That is, when an advertising packet is received, the mobile terminal 200 may omit inquiry of a user about whether an access is to be performed and request pairing.

Accordingly, an access permitting operation by a user is not necessary and it is possible to further improve convenience for a user and to perform an access of the mobile terminal 200 to the onboard device 100.

For example, when a user performs an operation of shaking the mobile terminal 200 and an acceleration value equal to or greater than a predetermined value is detected after the mobile terminal 200 has come within a predetermined communication range from the communication device 1 in Step S36, the communication system according to this embodiment may be configured to input an operation detection signal indicating that the operation of shaking the mobile terminal 200 has been performed to the onboard device 100 and to perform the processes of Step S37 and steps subsequent thereto at a time at which the operation detection signal is input. The pairing permitting unit 411 permits pairing with the mobile terminal when an acceleration value equal to or greater than a predetermined value is detected in the mobile terminal.

For example, the mobile terminal 200 includes an acceleration detecting unit and an operation detecting unit. The acceleration detecting unit measures acceleration values in an X-axis direction, a Y-axis direction, and a Z-axis direction which are perpendicular to each other. The operation detecting unit determines that a user of the mobile terminal 200 has requested start of a predetermined service (pairing herein) at a time point at which the acceleration values measured by the acceleration detecting unit become equal to or greater than a preset operation determination threshold value (a predetermined value), and inputs the operation detection signal indicating that an operation of shaking the mobile terminal 200 has been performed to the short-range radio communication control unit 456 illustrated in FIG. 4 (the communication control unit 22 illustrated in FIG. 2).

Accordingly, the short-range radio communication control unit 456 performs the processes of Steps S37 to S40, and the pairing permitting unit 411 of the onboard device 100 performs the processes of Steps S40 and S41. With this configuration, for example, when only a mobile terminal 200 of a specific user out of family members who own the vehicle 10 is desired to be subjected to pairing, the pairing process can be started only when the mobile terminal 200 of the specific user has been shaken. By using the acceleration values detected in the mobile terminal 200 in this way, it is possible to start pairing depending on a situation in which the vehicle 10 is used.

As described above, since the onboard device 100 according to this embodiment can permit pairing with the mobile terminal 200 without causing a user to perform predetermined setting as in the related art by sharing an identifier for uniquely identifying the onboard device with the mobile terminal 200, it is possible to improve convenience for a user.

The vehicle 10 according to this embodiment is not limited to an automobile, and may be, for example, a motorbike as long as it is a vehicle which can serve as a mobile object for movement of a user of the mobile terminal 200.

The program for an onboard device is an information processing program causing a computer to embody a communication unit that performs short-range radio communication with a mobile terminal and a paring permitting unit that permits pairing between the onboard device and the mobile terminal by causing the mobile terminal to receive data including an identifier for uniquely identifying the onboard device when the mobile terminal in which the same identifier is set comes within a predetermined distance from the onboard device.

The configuration which has been described above in the embodiment is only an example of details of the disclosure and can be combined with other known techniques, and a part of the configuration may be omitted or modified without departing from the gist of the disclosure.

What is claimed is:

1. An onboard device that is provided in a vehicle, the onboard device comprising:
   a communication unit configured to perform short-range radio communication with a mobile terminal; and
   a pairing permitting unit configured to permit pairing between the onboard device and the mobile terminal by automatically sending to the mobile terminal an identifier for uniquely identifying the onboard device and causing the mobile terminal to receive data including the identifier when the mobile terminal in which is set a same identifier as the identifier comes within a predetermined distance from the onboard device.

2. The onboard device according to claim 1, wherein the pairing permitting unit is configured to permit pairing with the mobile terminal when an acceleration value which is equal to or greater than a predetermined value is detected in the mobile terminal.

3. The onboard device according to claim 1, wherein the pairing permitting unit is configured to permit pairing with the mobile terminal when an accessory power source of the vehicle is turned on due to an approach of an owner of a wireless portable key to the vehicle.

4. The onboard device according to claim 1, wherein the pairing permitting unit is configured to permit pairing with the mobile terminal when an accessory power source of the vehicle is turned on due to touching of a door handle of the vehicle by an owner of a wireless portable key.

5. The onboard device according to claim 1, wherein the pairing permitting unit is configured to permit pairing with the mobile terminal when an accessory power source of the vehicle is turned on due to press of a start switch that is used to request starting of a system of the vehicle.

6. The onboard device according to claim 1, wherein the pairing permitting unit is configured to automatically send the identifier to the mobile terminal without setting by a user.

7. A non-transitory computer-readable medium storing an information processing program causing a computer to perform a process of:
    causing an onboard device that is provided in a vehicle to perform short-range radio communication with a mobile terminal; and
    permitting pairing between the onboard device and the mobile terminal by automatically sending to the mobile terminal an identifier for uniquely identifying the onboard device and causing the mobile terminal to receive data including the identifier when the mobile terminal in which is set a same identifier as the identifier comes within a predetermined distance from the onboard device.

\* \* \* \* \*